No. 849,662. PATENTED APR. 9, 1907.
H. G. COYKENDALL.
DRIVING AND STEERING MECHANISM FOR MOTOR VEHICLES.
APPLICATION FILED APR. 6, 1905. RENEWED FEB. 18, 1907.

2 SHEETS—SHEET 1.

Witnesses:
Arthur L. Slee
P W Bettinger

Inventor.
H. G. Coykendall
by N. A. Acker
his Atty.

No. 849,662. PATENTED APR. 9, 1907.
H. G. COYKENDALL.
DRIVING AND STEERING MECHANISM FOR MOTOR VEHICLES.
APPLICATION FILED APR. 6, 1905. RENEWED FEB. 18, 1907.

2 SHEETS—SHEET 2.

Witnesses.
Arthur L. Lee
P. W. Bettinger

Inventor.
H. G. Coykendall
by N. A. Acker
his atty.

UNITED STATES PATENT OFFICE.

HORATIO G. COYKENDALL, OF SAN JOSE, CALIFORNIA.

DRIVING AND STEERING MECHANISM FOR MOTOR-VEHICLES.

No. 849,662.     Specification of Letters Patent.     Patented April 9, 1907.

Application filed April 6, 1905. Renewed February 18, 1907. Serial No. 358,116.

*To all whom it may concern:*

Be it known that I, HORATIO G. COYKENDALL, a citizen of the United States, residing at San Jose, in the county of Santa Clara, State of California, have invented certain new and useful Improvements in Driving and Steering Mechanism for Motor-Vehicles; and I hereby declare the following to be a full, clear, and exact description of the same.

The invention relates to steering and driving mechanism for motor-vehicles generally—such as automobiles, traction-engines, and trucks—the same being applicable for both light and heavy vehicles, the object of the invention being to provide an improved gear-drive which, together with the steering mechanism, permits all four wheels of the vehicle to be driven simultaneously, irrespective of the position or angle which the wheels may assume, the invention being so designed as to permit of its use in connection with heavy vehicles, as traction-engines, trucks, and heavy automobiles with solid or non-rotating axles, and this without the employment of steering-knuckles commonly associated with the steering mechanism of automobiles.

To comprehend the invention, reference should be had to the accompanying sheet of drawings, wherein—

Figure 1:
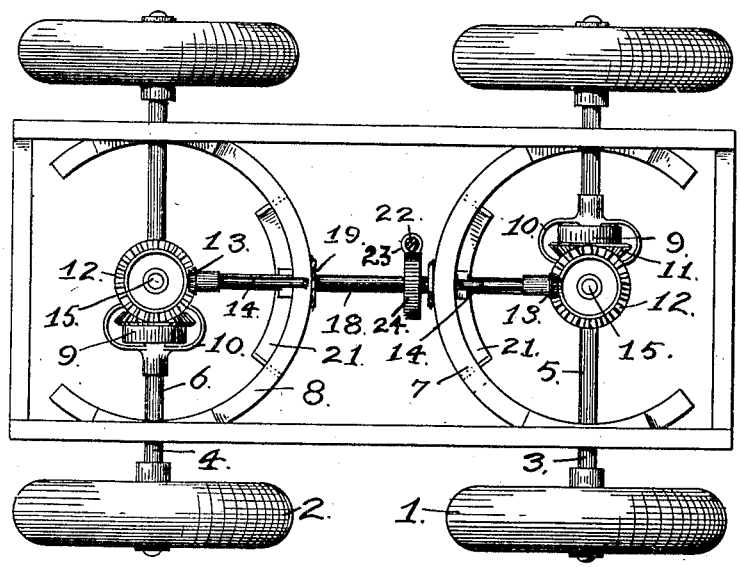
Figure 2:
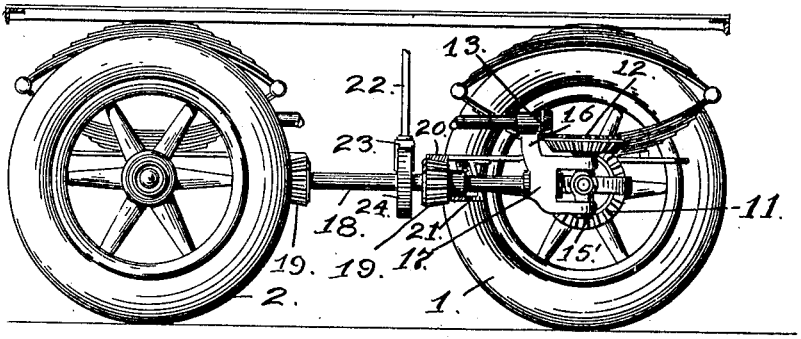
Figure 3:
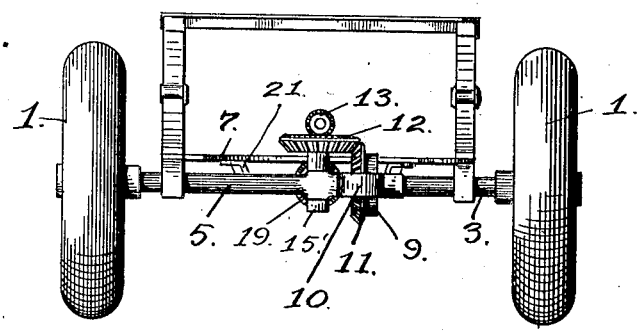
Figure 4:
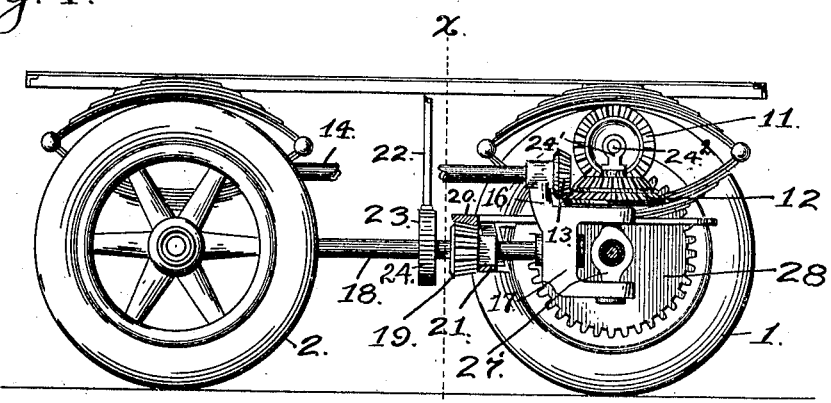
Figure 5:
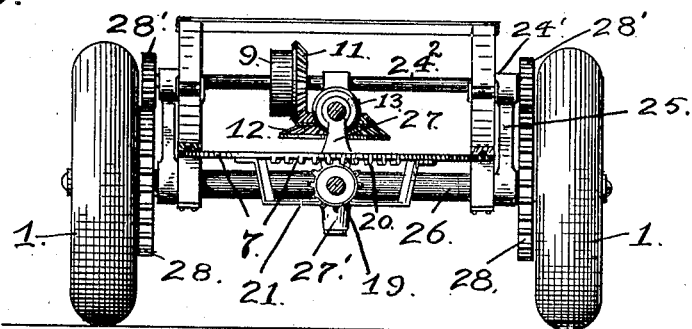
Figure 6:
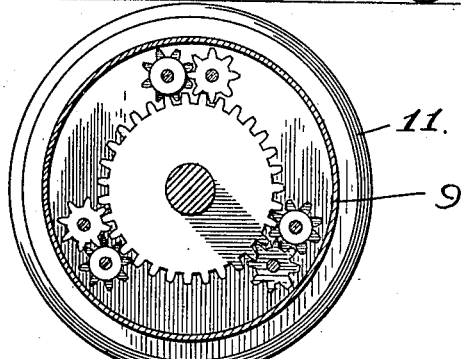
Figure 7:
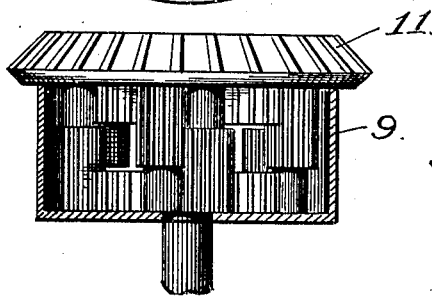

Figure 1 is a plan view of the running-gear of an automobile with the improved mechanism applied thereto. Fig. 2 is a side view in elevation of said parts, one of the rear wheels being removed to clearly illustrate the location of the various driving features, the hound to which the axle-tube is secured being sectioned. Fig. 3 is a rear view in elevation of the mechanism disclosed by Fig. 1 of the drawings. Fig. 4 is a view similar to Fig. 2 of the drawings, the invention being illustrated or applied to a heavy vehicle or such as employ non-rotating axles. Fig. 5 is a vertical sectional end view in elevation of the mechanism set forth in Fig. 4 of the drawings, taken on line *x x* of said view. Fig. 6 is a vertical sectional view of the differential gear mechanism ordinarily employed in connection with automobiles, the same being used to transmit the motion of the horizontal drive-gear for the driving of the rotating axles of a light vehicle or for imparting motion to a counter-shaft in case of a heavy vehicle or such as employ non-rotating axles; and Fig. 7 is a detail plan view of said differential gear mechanism, the inclosing casing being sectioned.

The numerals 1 and 2 indicate, respectively, the forward and rear wheels of the vehicle, which in Figs. 1, 2, and 3 are illustrated as secured to the projecting ends of the front and rear axles 3 and 4. These axles are rotating ones, the same rotating freely within the hollow or tubular sleeves 5 6. Said sleeves are secured to the horizontally-movable hounds 7 8, the axles working within the sleeve being the usual type of two-part axles. Each end of these axles extend within the inclosing casing 9 for the ordinary differential gear mechanism, consisting of a train of intermeshing pinions, Figs. 6 and 7 of the drawings, which are usually employed to drive the sections of the axle working within the tubular front and rear sleeves 5 6. This gear mechanism is supported within the bracket 10, Figs. 1 and 3 of the drawings. Motion is imparted to said mechanism by means of the gear 11, which is driven from a horizontally-disposed drive-gear 12. This gear is a double or two faced one, one face thereof meshing with the said gear 11, while its opposite face is engaged by a pinion 13, mounted on each end of the longitudinally-arranged drive-shaft 14, which shaft is driven by any suitable motor carried by the vehicle.

Each drive-gear 12, there being one for each axle of the vehicle, is mounted to revolve on a pin or stud 15, securely fastened to and projecting upwardly from the tubular sleeves 5 6, which inclose the rotating axles 3 4.

The drive-shaft is mounted in bearings of the brackets 16, which extend from the yokes 17. These yokes are mounted and held in place by the studs 15 and 15', which are secured to and project above and below the tubular sleeves for the axles. Said yokes also act as bearings for each end of the steering-rod 18, which rod serves as a reach for the vehicle.

On the steering-rod 18, near each end thereof, is securely fastened a pinion 19, which pinion meshes with the teeth of a rack-plate 20, attached to the under face of each hound 7 8. The said steering-rod is arranged immediately beneath the hounds, being supported thereto by the strap or stirrup 21. This steering-rod is oscillated by means of the steering-shaft 22, which carries a worm-pinion 23 at its lower end, that meshes with the worm 24 on the said steering-rod. It is obvious that as the steering-rod is rotated in either direction it actuates the hounds 7 8, and by thus swinging the same horizontally turn the wheels of the vehicle in the desired direction.

So far the invention has been described with reference to light vehicles or those employing rotating axles. Where the vehicle is a heavy one, such as a two-ton automobile or a traction-engine or motor-truck, it is the general practice to employ non-rotating axles. In such cases the general principle of the invention is such as before described, excepting that the tubular sleeve for the axles are dispensed with, and the differential gear mechanism previously mentioned is carried on a counter-shaft $24^2$, working in bearings 24' of brackets 25, upwardly projecting from the fixed axles 26 of the vehicle, Figs. 4 and 5 of the drawings. With such axles the wheels 1 2 turn loosely on the projecting ends thereof. A further difference is that the swinging hounds 7 8 are secured, respectively, directly to the front and rear axles, so that the axles are swung on an arc of a circle with the movement of the said hounds in accordance with the direction in which the steering-rod 22 is rotated. Also instead of the double-faced horizontally-disposed drive-gears 12 being mounted on the pin projecting from the tubular sleeves the same is mounted on a pin or stud 27, upwardly projecting from the front and rear stationary axles 26, which, together with the depending stud or pin 27', support the yokes 17.

To transmit the motion of the counter-shaft $24^2$, the hub of each wheel of the vehicle has fastened thereto a cog-gear 28, which is engaged by a cog-pinion 28', secured to each projecting end of the said counter-shafts.

Except for the noted changes the arrangement of the drive mechanism and that of the steering means is substantially the same when used in connection with heavy vehicles as when employed for the steering and driving of light vehicles.

The essential feature of the present invention is the employment of the horizontally-disposed drive-gear for actuating the means to impart rotation to the wheels of the vehicle, and this feature it is wished to be claimed broadly whether used in connection with the operating of rotating axles or for driving the wheels mounted to rotate on fixed or stationary axles, and I wish also to be understood as claiming, broadly, the use of the horizontally-swinging hounds for turning the front and rear axles in unison when said hounds are actuated by the steering mechanism of the vehicle.

Having thus described the invention, what is claimed as new, and desired to be protected by Letters Patent, is—

1. The combination with the gear mechanism at each end of the vehicle for imparting rotation to the wheels thereof, of horizontally-disposed drive-gears for operating said mechanism, and a longitudinally-disposed rigid drive-shaft for simultaneously actuating each horizontally-disposed drive-gear.

2. The combination with gear mechanism at each end of the vehicle for imparting rotation to the wheels thereof, of horizontally-disposed drive-gears for operating said mechanisms, a continuous rigid longitudinally-extended drive-shaft for simultaneously actuating each horizontally-disposed gear, and means for simultaneously swinging the forward and rear pairs of supporting-wheels for the vehicle.

3. The combination with the front and rear axle of the vehicle, of means for simultaneously swinging the said axles horizontally, driving means situated at each end of the vehicle, and a continuous rigid longitudinally-arranged drive-shaft for actuating said means simultaneously for the propelling of the vehicle.

4. The combination with front and rear axles of a vehicle, separated gear mechanism for imparting movement to the front and rear wheels mounted on said axles, and a continuous rigid longitudinally-extended drive-shaft operatively associated with both gear mechanisms, the said shaft being fixedly supported adjacent opposite ends to the respective axles, in combination with steering mechanism adapted to impart simultaneous movement to the respective axles without interrupting the operation of said gear mechanism.

5. The combination with front and rear axles of a vehicle, of hounds secured to the respective axles, yoke-brackets secured to the respective axles, and a continuous rigid steering-rod fixedly supported upon said brackets and operatively associated with said hounds to simultaneously swing the same.

6. The combination with front and rear axles, of hounds secured to the respective axles, yoke-brackets secured to said axles, a continuous rigid steering-rod fixedly connected to the respective brackets and operatively associated with said hounds to simultaneously swing the same, separated gearing for each axle, and a longitudinally-extended continuous rigid drive-shaft operatively associated with said gearing and fixedly mounted in said brackets.

In testimony whereof I have hereunto set my hand in the presence of witnesses.

HORATIO G. COYKENDALL.

Witnesses:
   N. A. ACKER,
   P. W. BETTINGER.